(No Model.)
J. H. MITCHELL.
DRIVE CHAIN.
No. 533,311. Patented Jan. 29, 1895.
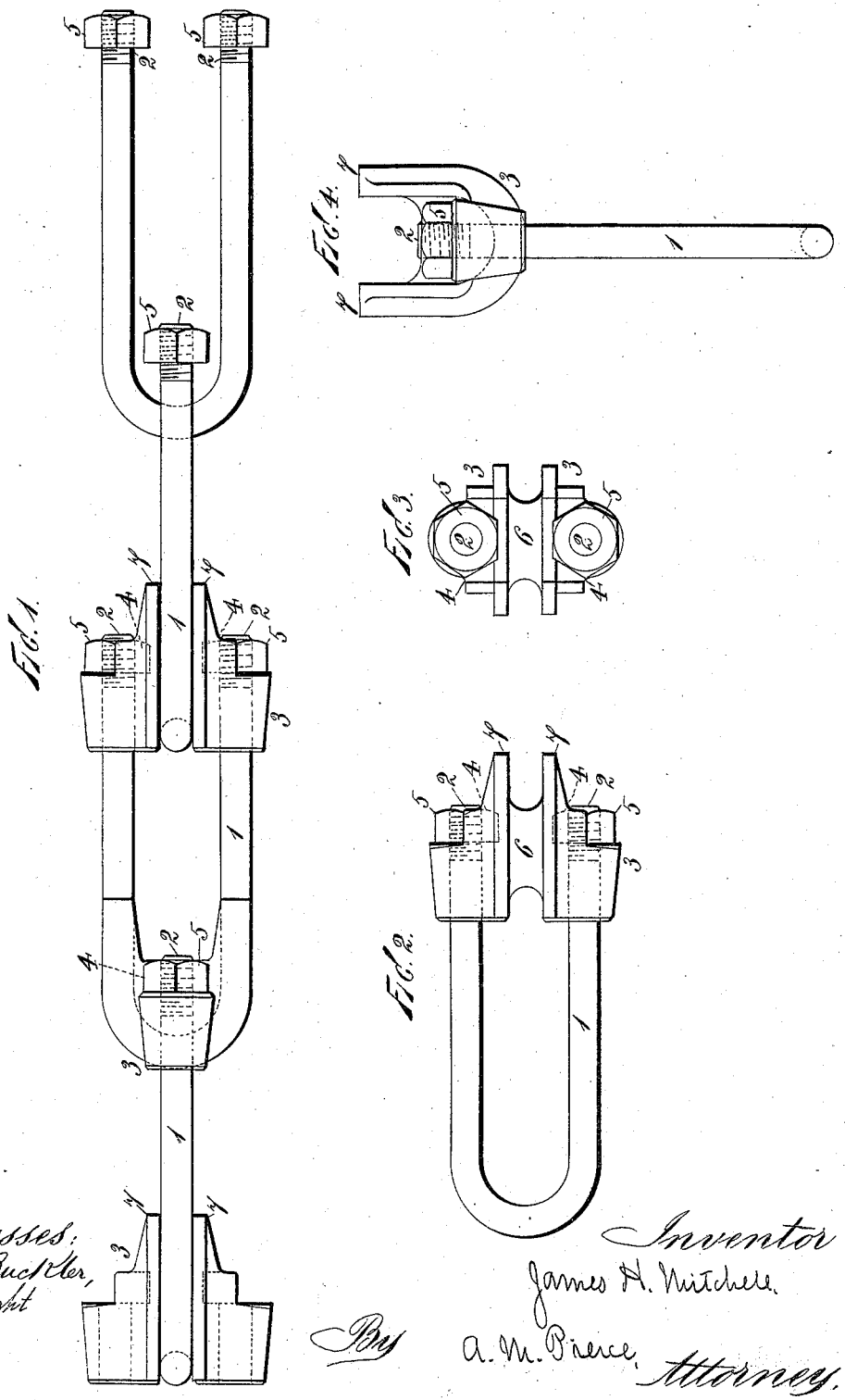
Witnesses:
John Buckler,
E. D. Wright
Inventor:
James H. Mitchell
By A. M. Pierce, Attorney

UNITED STATES PATENT OFFICE.

JAMES H. MITCHELL, OF PHILADELPHIA, PENNSYLVANIA.

DRIVE-CHAIN.

SPECIFICATION forming part of Letters Patent No. 533,311, dated January 29, 1895.

Application filed November 23, 1894. Serial No. 529,689. (No model.)

*To all whom it may concern:*

Be it known that I, JAMES H. MITCHELL, a citizen of the United States, residing in the city and county of Philadelphia, State of Pennsylvania, have invented a new and useful Improvement in Drive-Chains, of which the following is a specification.

My invention relates especially to chains employed for transmitting power or motion by engaging with sprocket wheels, and has for its object the provision of a simple, cheap and effective drive chain, wherein very few parts are employed, and each link of the chain is made adjustable and self-locking when the chain is in motion.

To attain the desired end, my invention consists essentially in a chain formed of built up links, comprising a U shaped body, the ends whereof are screw-threaded for the reception of holding and locking nuts, and a bearing piece or cross-bar through which the ends of the body pass, said bearing piece being provided with a depression for the reception of the next link in the chain; and my invention also involves certain other novel and useful combinations or arrangements of parts, and peculiarities of construction and operation, all of which will be hereinafter first fully described and then pointed out in the claim.

In the accompanying drawings, forming a part hereof, Figure 1 is a plan view of a portion of a chain constructed in accordance with my invention. Fig. 2 is a plan view of one of the links, separated from the chain, and Fig. 3 is an end view thereof, looking from the right. Fig. 4 is a side elevation thereof.

Like numerals of reference, wherever they occur, indicate corresponding parts in all the figures.

1 is the U shaped body of the link, screw-threaded at each extremity 2.

3 is a bearing piece or cross-bar, perforated for the passage of the ends of the body 1 of the link, and provided with locking cavities, 4, arranged to receive nuts, 5 engaging with the screw-threaded ends 2 of the link body 1, preventing the turning of said nuts, and firmly locking the parts in place, when the chain is drawn tight.

6 is a depression formed in the cross-bar, arranged to receive the curved portion of the U shaped body of the next succeeding link.

7 are rearwardly projecting lips which embrace the link body, and effectually prevent any twisting or lateral movement thereof.

When constructed in accordance with the foregoing description, my improved drive chain will be found admirably adapted to driving all kinds of machinery where sprocket wheels are used. It is simple and cheap in construction, very few parts being employed; each link is made adjustable and self-locking, and from its peculiar arrangement the chain has a universal movement, and can be bent to run in any direction.

Having now fully described my invention, what I claim as new therein, and desire to secure by Letters Patent, is—

In a drive chain, a U shaped link having its extremities screw threaded and bearing adjusting nuts, in combination with said nuts and a bearing piece or cross piece arranged to receive the extremities of the U shaped body, lock the nuts in place, and hold the next link, substantially as shown and described.

JAMES H. MITCHELL.

Witnesses:
A. M. PIERCE,
E. D. WRIGHT.